US008998050B1

(12) United States Patent
Battle

(10) Patent No.: US 8,998,050 B1
(45) Date of Patent: Apr. 7, 2015

(54) BICYCLE CARRYING SYSTEM

(75) Inventor: Ryan Battle, Austin, TX (US)

(73) Assignee: Ryan Battle, Austin, TX (US)

( * ) Notice: Subject to any disclaimer, the term of this patent is extended or adjusted under 35 U.S.C. 154(b) by 309 days.

(21) Appl. No.: 13/370,080

(22) Filed: Feb. 9, 2012

Related U.S. Application Data

(60) Provisional application No. 61/462,929, filed on Feb. 9, 2011, provisional application No. 61/517,289, filed on Apr. 18, 2011.

(51) Int. Cl.
*B60R 11/00* (2006.01)
*B60R 9/10* (2006.01)

(52) U.S. Cl.
CPC .......................... *B60R 9/10* (2013.01)

(58) Field of Classification Search
CPC ............ B60R 11/00; B60R 1/485; B60R 1/52
USPC .................................................. 224/489, 512
See application file for complete search history.

(56) References Cited

U.S. PATENT DOCUMENTS

| 1,641,502 | A | * | 9/1927 | Price | 224/489 |
|---|---|---|---|---|---|
| 4,171,077 | A | * | 10/1979 | Richard, Jr. | 224/500 |
| 4,413,761 | A | * | 11/1983 | Angel | 224/485 |
| 5,423,644 | A | * | 6/1995 | First, Sr. | 410/100 |
| 6,889,880 | B2 | * | 5/2005 | Albaisa et al. | 224/491 |
| 7,246,833 | B2 | * | 7/2007 | Exline | 293/117 |
| 8,418,902 | B2 | * | 4/2013 | Cha et al. | 224/496 |
| 2002/0175196 | A1 | * | 11/2002 | Johnson | 224/514 |
| 2004/0040995 | A1 | * | 3/2004 | Ferrigan | 224/512 |
| 2007/0069534 | A1 | * | 3/2007 | Morrill et al. | 293/117 |
| 2008/0142559 | A1 | * | 6/2008 | Lim et al. | 224/489 |
| 2012/0205413 | A1 | * | 8/2012 | Degenstein et al. | 224/512 |

* cited by examiner

*Primary Examiner* — Brian D Nash
(74) *Attorney, Agent, or Firm* — Rory D. Rankin; Meyertons, Hood, Kivlin, Kowert & Goetzel, P.C.

(57) ABSTRACT

A bicycle carrying system includes a first bicycle wheel mount device, a second bicycle wheel mount device, and one or more straps. The first bicycle wheel mount device couples on a vehicle bumper at a first location on the vehicle bumper. The second bicycle wheel mount device couples on a vehicle bumper at a second location on the vehicle bumper. The straps secure a frame of the bicycle to the vehicle.

22 Claims, 4 Drawing Sheets

BICYCLE CARRYING SYSTEM

CROSS REFERENCE TO RELATED APPLICATIONS

This application claims the benefit of priority to U.S. Provisional Patent Application Nos. 61/462,929, entitled "Light Weight and Portable Bicycle Carrying Device for Vehicles," filed Feb. 9, 2011, and 61/517,289, entitled "Detachable, Portable, Lightweight Bike Carrying Apparatus for Vehicles," filed Apr. 18, 2011, the entirety of both of which are incorporated herein by reference.

BACKGROUND

1. Field of the Invention

Embodiments of the invention generally relate to apparatus and methods for personal transportation. More particularly, embodiments of the invention relate to apparatus and method for carrying bicycles on vehicles.

2. Description of Related Art

Vehicle carrier racks are typically mounted on the exterior of a motor vehicle to support bicycles, skis, surf boards, kayaks, etc., above the ground. In a typical installation, these racks are permanently attached to the motor vehicle and are constructed of rigid frame members having arms extending horizontally for supporting objects such as bicycles. However, there are problems associated with such racks associated with their weight, inflexible structure, difficulty of movement and/or adjustment, immobility, complexity of construction and/or assembly, proliferation of straps, an impairment of access to the vehicle.

SUMMARY

Various embodiments of apparatus and methods for personal transportation, and for carrying bicycles or other items, are disclosed. In one embodiment, the present invention relates to a bumper assembly and associated methods for releasably attaching a carrying rack to a rear bumper of a motor vehicle.

In an embodiment, a bicycle carrying system includes a first bicycle wheel mount device, a second bicycle wheel mount device, and one or more straps. The first bicycle wheel mount device couples on a vehicle bumper at a first location on the vehicle bumper. The second bicycle wheel mount device couples on a vehicle bumper at a second location on the vehicle bumper. The straps secure a frame of the bicycle to the vehicle. The bicycle carrying system may be lightweight and portable.

In an embodiment, a bicycle wheel mount device includes a bumper-mounting portion and a bicycle wheel mount portion coupled to the bumper-mounting portion. The bumper-mounting portion may mount on a bumper of a vehicle. The bicycle wheel mount portion may support a bicycle wheel of a bicycle. The bumper-mounting portion and a bicycle wheel mount portion may be separable from one another.

In an embodiment, a method includes supporting at least one wheel of a bicycle on a vehicle bumper; and securing a frame of the bicycle to the vehicle with one or more securement devices. The securement device passes through at least one seam in the vehicle.

BRIEF DESCRIPTION OF THE DRAWINGS

Advantages of the present invention will become apparent to those skilled in the art with the benefit of the following detailed description and upon reference to the accompanying drawings in which.

Figure 1:
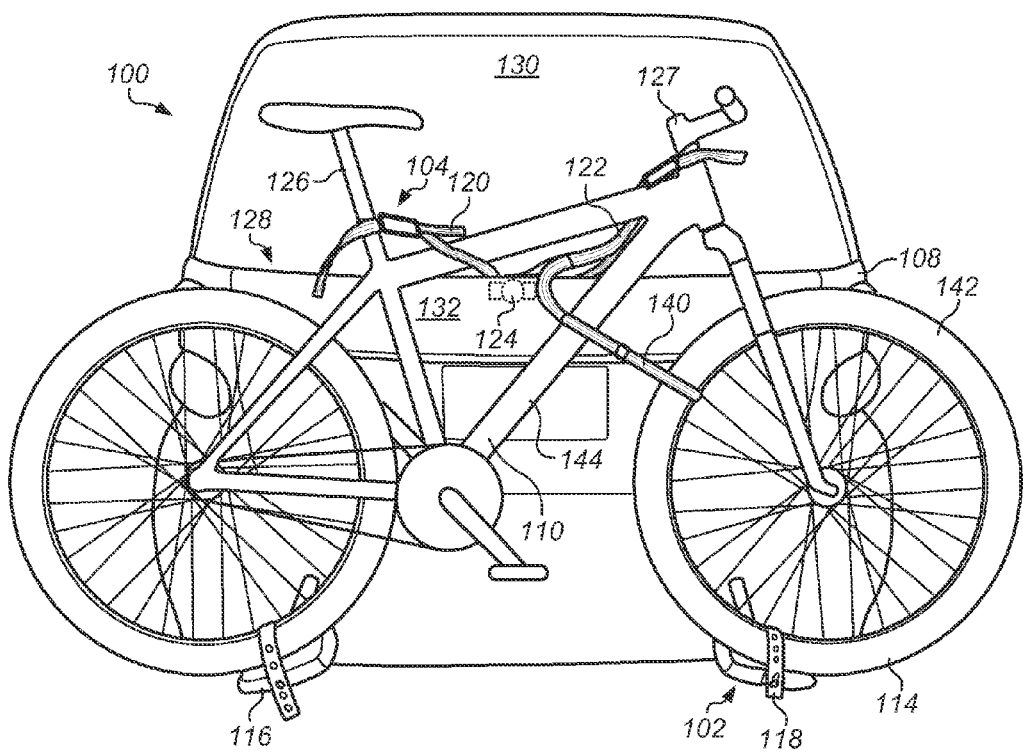
FIG. 1 illustrates one embodiment of a bicycle carrying system on a vehicle.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims. The headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means directly or indirectly coupled.

DETAILED DESCRIPTION OF ILLUSTRATIVE EMBODIMENTS

Various methods, systems, and apparatus are described for mounting a carrying system for a bicycle to a motor vehicle, and for using carrying systems. In one embodiment, a plurality of support structures may be releasably affixed to the vehicle (for example, at the rear bumper) in combination with one or more securement devices or straps for securing the carry load to the carrying assembly.

In some embodiments, a portable carrying assembly is implemented as a light weight and portable bicycle carrying assembly or apparatus. The carrying assembly or apparatus may be easily and quickly installed for carrying a bicycle on the vehicle during a vehicle trip. After reaching the travel destination, the portable carrying assembly may be easily and quickly removed from the vehicle. The apparatus may be stored in a compact carrying arrangement and carried away on the bicycle. In certain embodiments, the disclosed portable bicycle carrying assembly is used with car sharing services. Carrying systems as described herein may, however, be used by any consumer who desires a simple, portable bicycle carrying solution for the consumer's vehicle.

In some embodiments, the portable bicycle carrying system can be removed from the vehicle and carried in a typical computer bag, like sized bag. In some embodiments, the carrying system may be attached to a bicycle after removal from the vehicle.

As described herein with reference to various example embodiments, the portable bicycle carrying assembly may include two wheel mount devices which are releasably attached to the rear bumper assembly of a vehicle for supporting and securing the bicycle wheels in a carrying position, such as by screwing a pair of separate wheel mount devices into pre-formed holes in a rear bumper assembly. In addition, the portable bicycle carrying assembly may include one or more mounting devices, which may be releasably attached to the vehicle for supporting and securing the bicycle in the carrying position, such as by attaching one or more adjustable straps to the vehicle and to the bicycle to secure and stabilize the bicycle. The portable bicycle carrying assembly may also include one or more stability devices, which may be releasably attached to secure the bicycle in the carrying position, such as by attaching one or more adjustable straps to secure the front wheel of the bicycle to the bicycle frame.

FIG. 1 illustrates one embodiment of a bicycle carrying system on a vehicle. Bicycle carrying system 100 includes wheel mount devices 102 and securement device 104. Each of wheel mount devices 102 is mounted on bumper 106 of vehicle 108. Each of wheel mount devices 102 supports one wheel of bicycle 110. In some embodiments, each of wheel mount devices 102 is screwed into a threaded hole in bumper 106. Wheels 114 of bicycle 110 may be supported on stirrups 116 of wheel mount devices 102.

In some embodiments, wheel mount devices 102 may be angularly adjusted. For example, stirrups 116 may be tilted outwardly or inwardly. Angular adjustment of wheel mount devices may allow a user to adjust a position and orientation of a bicycle on a vehicle. For example, the user may angularly adjust stirrups 116 such that bicycle 110 is level on vehicle 108.

Wheels 114 may be secured by one of wheel straps 118. Wheel straps 118 may be flexible members that pass between spokes of wheels 114. The ends of wheel straps 118 may engage on stirrups 116. Each of wheel straps 118 may include a series of holes. The appropriate hole may be selected for latching down wheel strap 118 (based, for example, on wheel size and rim size).

Securement device 104 includes strap 120, strap 122, and coupling loop 124. Strap 120 may loop around seat post 126 of bicycle 110. Strap 120 may loop around stem 127 of bicycle 110. Vehicle coupling loop 124 may extend through seam 128 between hatch window 130 and hatch door 132. In some embodiments, coupling loop 124 is secured on a latch device for hatch window 130. Any or all of strap 120, strap 122, and coupling loop 124 may be adjustable so that securement device 104 can be tightened and loosened as needed.

In some embodiments, a bicycle carrying system includes one or more stability devices. The stability devices may be releasably attached to secure the bicycle in a carrying position. For example, one or more adjustable straps may be attached to secure the front wheel of the bicycle to the bicycle frame. As shown in FIG. 1, for instance, carrying system 100 includes stability strap 140. Stability strap 140 may connect front wheel 142 of bicycle 110 to down tube 144 of bicycle 110. Stability strap 140 may wrap around down tube 144 and front wheel 142. Strap clip ends of stability strap 140 may be connected together when the strap is wrapped around down tube 144 and front wheel 142 of bicycle 110. Once the strap clips are connected, the user may pull the strap ends in opposing directions to tighten the strap device.

In some embodiments, strap 120 and strap 122 are each a different color. Different color straps may provide a visual indication to a user which strap to use for a particular element of the bicycle. In some embodiments, straps may be marked to distinguish one strap from another.

In some embodiments, two independent wheel mount stirrups are attached to the vehicle bumper. In one embodiment, the two wheel mount stirrups are identical to one another. The stirrups may be adjustable to enable safe fit of a wide variety of bicycle sizes with flexible straps that secures each tire on their respective mounts. In some embodiments, a system includes two or more different vehicle mount adapters, each of which can be used with a common wheel mount element. For example, one stirrup may be used interchangeably with adapters for two or more different bumpers. In certain embodiments, a bicycle wheel mount device is attached to a bumper by elements other than a threaded rod, such as a hook or a clamp. In certain embodiments, a vehicle to which a carrying system is attached is a Smart Car made by Daimler Chrysler and the wheel mount devices are installed in bumper tow holes on the rear bumper of the vehicle.

Figure 2:
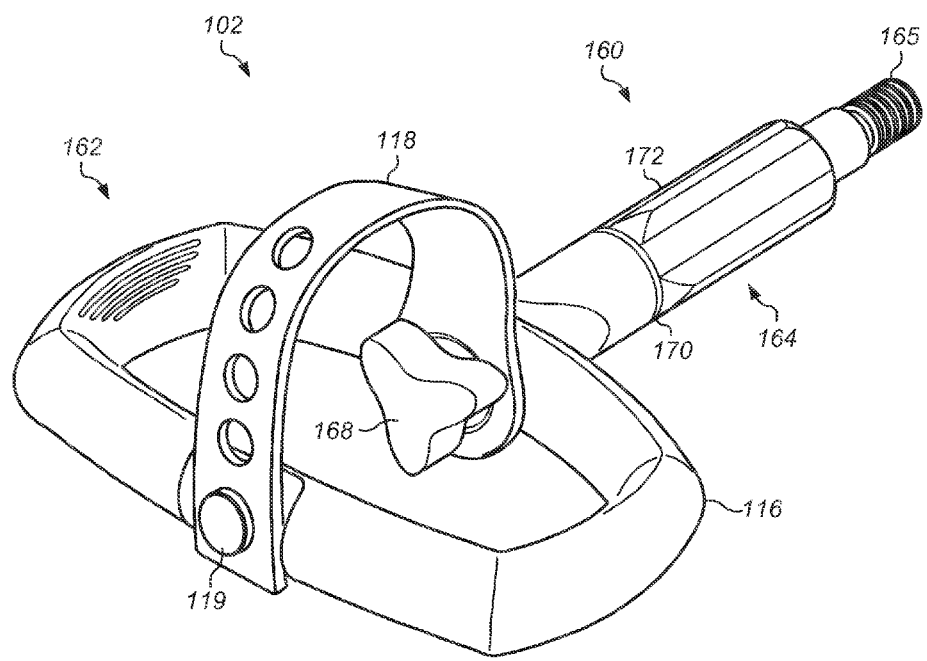
FIG. 2 illustrates one embodiment of a wheel mount device that can be used in a bicycle carrying system.
Figure 3:
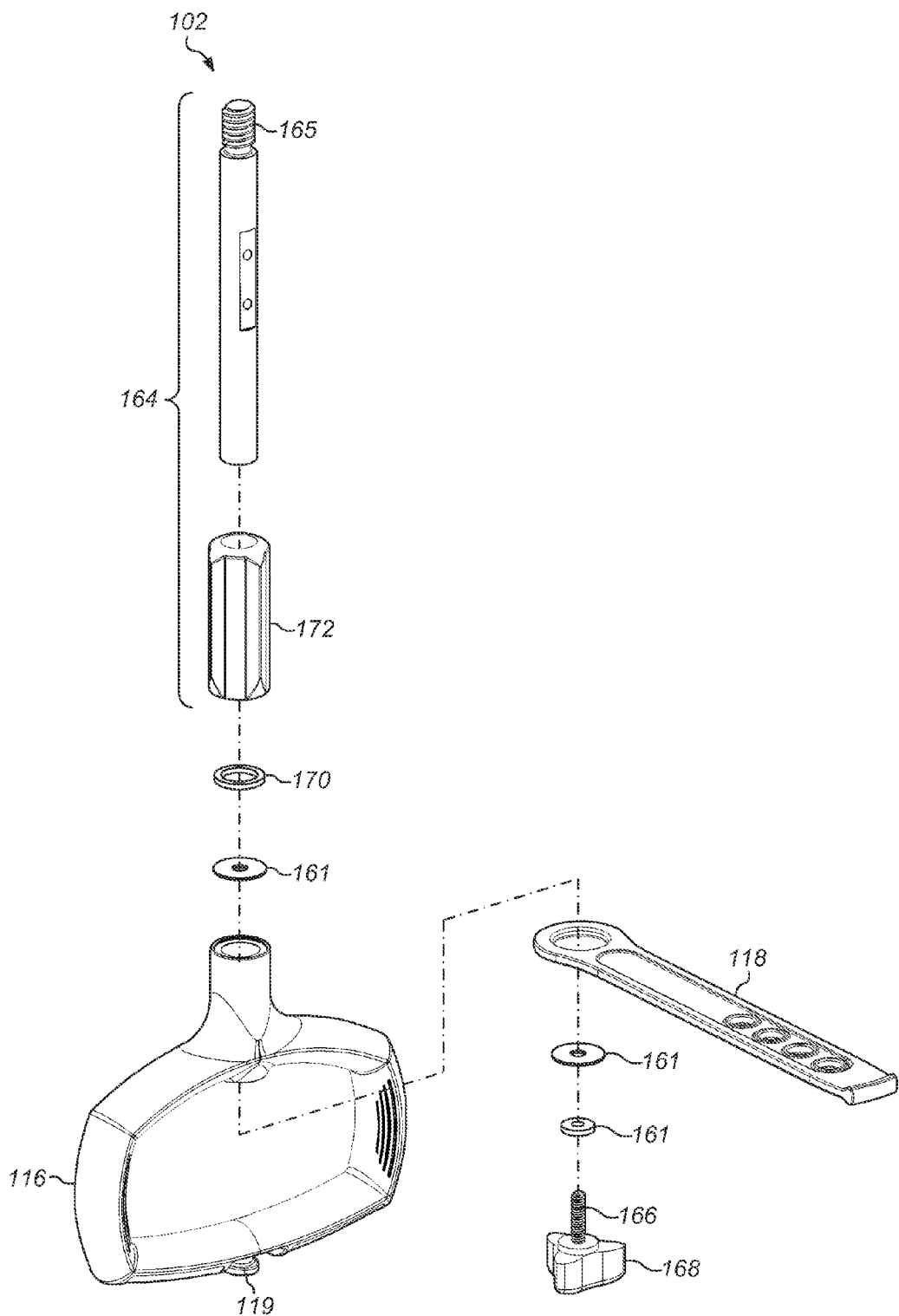
FIG. 3 is an exploded view illustrating one embodiment of a wheel mount device.

FIG. 2 illustrates one embodiment of a wheel mount device that can be used in a bicycle carrying system. FIG. 3 is an exploded view illustrating one embodiment of a wheel mount device. Wheel mount device 104 includes vehicle-mounting portion 160 and wheel mount portion 162. Vehicle-mounting portion 160 and wheel mount portion 162 may be separable form one another.

Wheel mount device 102 includes stirrup 116, wheel strap 118, and adapter 164. Adapter 164 may receive tightening screw 166. Stirrup 116 includes strap button 119. Knob 168 may be used to turn tightening screw 166. Elastomeric washer 170 may be provided between stirrup 116 and wheel mount grip 172. Tightening screw 166, adapter 164, stirrup 116, wheel strap 118, and elastomeric washer 170 may cooperate to form a tension joint. Washers 161 may be included in the tension joint. The tension joint may allow for rotational adjustment between adapter 164 and stirrup 116. In some embodiments, a tension joint allows for adjustment of stirrups 116. For example, tension joints may be adjusted such that a carrying system fits a wide variety of bicycle wheel bases and/or to address variable and irregular tow hole threading between different vehicles.

Wheel mount device 164 may provide support for a wide variety of bicycle tire and rim sizes. Wheel strap 118 may be adjusted to fit based on the size of the rim and tire of the bicycle to be carried. Rotation of stirrup through tension joint may allow bicycles of varying wheelbase dimensions to be carried. In some embodiments, stirrup 116 includes recessed tire gripping grooves for engagement with the bicycle tire treads when placed on the wheel mount stirrup.

In one embodiment, adapter 164 includes an aluminum rod. In another embodiment, adapter 164 includes an interior steel rod. Adapter 164 may include a male threading for vehicle attachment, through holes for over mold grip adherence and a female threaded end orifice for wheel mount stirrup knob and screw attachment. Wheel mount grip 172 may enable consumer to easily screw in and out the wheel mount apparatus to the vehicle bumper. A threaded end 165 of adapter 164 may be fabricated to the specification of models of different vehicles (for example, vehicles that possess bumper tow ports of a particular thread size and pitch.)

In some embodiments, mounting devices are releasably attached to the vehicle for supporting and securing the bicycle in the carrying position, such as by attaching one or more adjustable straps to the vehicle and to the bicycle to secure and stabilize the bicycle.

Figure 4A:
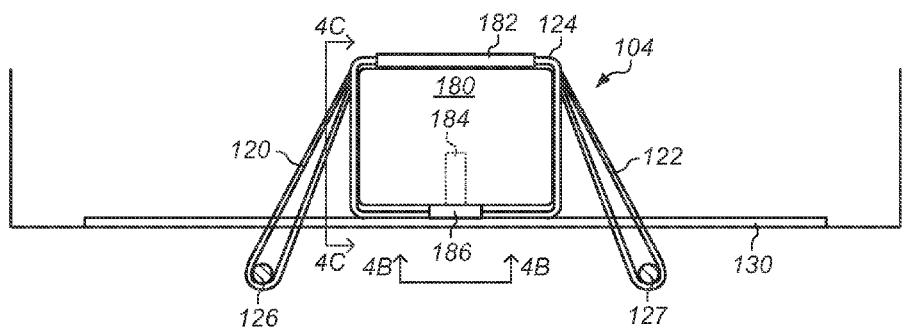
FIG. 4A is a top view illustrating a securement device including a strap assembly for securing a frame of a bicycle to a vehicle.

FIG. 4A is a top view illustrating a securement device including a strap assembly for securing a frame of a bicycle to a vehicle. Securement device 104 includes strap 120, strap 122, and coupling loop 124. Strap 120 may loop around seat post 126 of bicycle 110. Strap 120 may loop around stem 127 of bicycle 110. Vehicle coupling loop 124 may extend through seam 128 between hatch window 130 and hatch door 132. Coupling loop 124 is secured on a latch device 180 for hatch window 130.

Securement device 124 includes strap sleeve 182. In some embodiments, strap sleeve 182 is made of an elastomeric material. Straps may fit snugly within strap sleeve 182. Strap sleeve 182 may carry strap 120, strap 122, and coupled loop 124. In some embodiments, strap 120, strap 122, and coupled loop 124 can be cinched by adjusting the straps within strap sleeve 182.

Figure 4B:
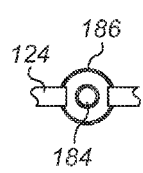
FIG. 4B is a front schematic view illustrating a connection of strap assembly of a securement device in hatch window latch system.
Figure 4C:
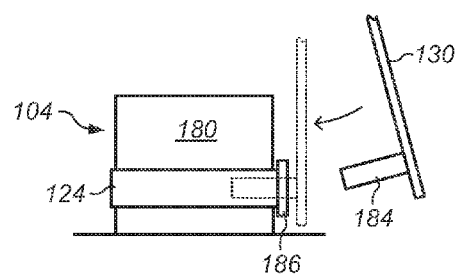
FIG. 4C is a side schematic view illustrating a connection of strap assembly of a securement device in hatch window latch system.

FIG. 4B is a front schematic view illustrating a connection of strap assembly of a securement device in hatch window latch system, which may be taken along lines 4B-4B shown in FIG. 4A. FIG. 4C is a side schematic view illustrating a connection of strap assembly of a securement device in hatch window latch system, which may be taken along lines 4C-4C shown in FIG. 4A. After securement device 104 is placed, any or all of strap 120, strap 122, and coupling loop 124 may be adjusted so that securement device 104 achieve desired fit on latch device 180. Bolt 184 on hatch window 130 may pass through ring 186 of coupling loop 124. When hatch window 130 is closed, coupling loop 124 may be securely held in place with respect to the vehicle.

Strap clip ends (for example, on strap 120 and strap 122) may enable each side of like colored straps to be connected and tightened. The straps that connect are like colored and the clips on their ends may be crossed such that unlike colored straps may never be connected around the bike. This juxtaposing of clips and bi-colored straps may allow for the user to easily and readily identify the straps that go together. In some embodiments, independent straps may ensure there is no shifting of the bicycle during usage. Once strap clips are attached around the seat post and the head tube, respectively, the straps may be tightened by pulling on the strap ends. In some embodiments, a rubber like material where the straps are all sewn together which provides friction when the bike is attached which reduces movement of the straps during use.

In one embodiment, a user makes use of a carrying system by riding the user's bicycle to the location of the car and removing the bike rack components from a bag. The user may first screw one wheel mount apparatus into the bumper tow hole of the car by twisting the wheel mounts grip until the wheel mount apparatus is firmly attached to the bumper. The user may then repeat that action with the other wheel mount apparatus. Once both wheel mounts have been tightened in place, the user may open the rear window of the vehicle (for example, using the car's remote control found on the head of its key) and lays the base of the dual strap apparatus over the large plastic window lock base. The user may pull down on the strap ends to eliminate strap slack and close the window over the straps.

The user may then attach the bike stability strap around the bicycle's front tire and down tube and pull it tight to secure the front tire from rotating around its own hub or front fork. The user may then lift the bicycle on top of the wheels mounts. As the bicycle wheels are placed on the mounts, the wheel mount stirrups may be angled (for example, by engaging the mounts friction joint) to allow the bike to sit parallel to the ground. Once the bicycle is positioned, the user may thread the rubber support straps through the spokes of each wheel, over the rim and tire, affixing them to the recessed connector at the tip of each wheel mount. The user may then connect one of the two straps previous installed through the rear window seam around the head tube, and connect the second strap around the seat post. The user may then tighten the two straps to so the bike is fitted snuggly to the vehicle. The user may then enter the car and drive to a desired destination.

To uninstall the bicycle carrying system, the steps described above may be performed in reverse (for example, by loosening and/or disconnecting the straps instead of tightening them.)

In some embodiments, a front wheel and fork immobilization assembly includes a strap and interlocking clips. The strap may be placed around the front tire/rim and bicycle down tube it eliminates rotation of the front fork and rotation of the front tire around its axle. This assembly may work in concert with a strapping assembly and wheel mount devices to immobilize a bicycle during transport on a vehicle.

In some embodiments, a stability strap is integrated into the other strap elements. The user may connects the stability strap around the tire when the other straps are connected. The user may not need to check out a vehicle until the user has mounted the bicycle on the vehicle, then once checked out the user may need only to spend about a minute installing the strap around the bicycle.

In one embodiment, a system includes dual bi-colored adjustable straps with interlocking clips that secure and stabilize the bike. Each strap's independent color may allow for simple and immediate identification so as to hasten installation. In some embodiments, a gripping strip is applied at the join point between the straps, which may increases friction and reduce movement when pressure is applied.

In one embodiment, a user first installs the front and rear wheel supports of a carrying system on the bumper of a car. Once the supports have been tightened in place the user lifts their bicycle on top of the supports, centering the front tire in the front support. The user then extends the retractable hooked strap from the bicycle to the vehicle and places the hook in an available seam (for example, the seam between the trunk and the body of the vehicle). Once the hook is secured in a seam the user may pull down on the strap until the strap is taut between the vehicle and the bike. Finally, the user may pull the flexible straps on the front support over the front bicycle rim and tire and attaches it to the end of the front support. The user may then repeat that action on the rear support and tire.

In one embodiment, a retractable and adjustable securement device includes a connector (such as a hook) at the end. The securement device may extend from the bicycle's top tube or handle bar to the roof or trunk seam of the vehicle. This component may attach to the bicycle with a strap that allows it to be attached to a variety of different tube and handle bar diameters. The securement device encloses a spring or other resilient mechanism that causes the strap to retract into the housing when unattached to the vehicle.

In one embodiment, a carrying system includes durable cloth strap with sufficient length to reach to the trunk, hatchback or rear door of most vehicles. The strap may loop around the end hook back onto itself then through a small strap adjustment that allows tension to be applied to the strap and holding it in place. Lifting up on the strap adjustment may relieve the tension and allow the hook to be dismounted from the vehicle.

In one embodiment, a coated end hook attaches to a seam on the rear of the vehicle allowing the bicycle to be held upright on the front and rear wheel supports. The coated end hook may also transfer some of the bicycle weight off the supports.

Devices for a bicycle carrying system may be made of any suitable material or combination of materials. In one embodiment, a wheel mount device is made from 7075-T6 extruded Aluminum cored with 10% Glass filled Polypropylene with a 5 year UV package to prevent or reduce degradation due to sun exposure. Rim/tire straps may be Softflex 2701 thermoplastic elastomer, with 5 year UV package.

In one embodiment of a securement device, a webbing system includes 3 high performance side release buckles that can secure a bicycle to a vehicle. The bicycle may be secured in a 5 point harness, which may decreases the potential of the bike becoming separated from the car under any circumstance. In one embodiment, each stirrup supports 150 pounds or more.

In certain embodiments, stirrups include reflective elements. The reflective elements may be, for example, reflective tape applied to the rear surfaces of the stirrups.

In various embodiments described above, systems and methods are described for carrying bicycles. Systems, mounting devices, and securement devices, and various combinations thereof, and methods of using such systems, mounting devices, and securement devices, may be used to carry other items. Examples of items that may be carried on a vehicle in various embodiments include scooters, skateboards, long boards, surfboards, kayaks, personal watercraft, water skis, snow skis, snow shoes, fishing gear, camping gear, groceries, and luggage. In some embodiments, an item is carried on one or more bumper-mounted support devices. In other embodiments, an item is carried on a securement-device, such as a strap assembly, that couples in a seam in a vehicle.

In one embodiment, a system for carrying items on a vehicle includes one or more mount devices configured to couple on a vehicle bumper and one or more straps is contemplated. The mount devices may support a first portion of the item. The one or more straps may secure a second portion of the item to the vehicle. In certain embodiments, an item may be held on a vehicle solely by way of a securement device that couples in a seam of a vehicle, such as the securement device described herein relative to FIGS. 4A-4C.

As used herein, a "strap" means a flexible, bendable, or curvable element or combination of elements that can be used to hold one element with respect to at least one other element. In one embodiment, straps of a securement device are made of flexible nylon strips. Other examples of straps may include cords, ropes, chains, and linkages.

As used herein, a "seam" means a gap, break, or junction between two external members. Examples of seams include a gap between a rear gate and a rear window of a car, a gap between a roof a car and a rear gate, and a gap between a lip of a trunk and a body of a car.

As used herein, a "linkage" means a combination of two or more links connected to one another at one or more joints.

As used herein, "lock" means to hold an element in place with respect to at least one other element until a user performs an action that unlocks the mechanism.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A bicycle carrying system, comprising:
   a first bicycle wheel mount device configured to couple directly to a vehicle bumper at a first location on the vehicle bumper, wherein the first wheel mount device is configurable to support a first wheel of a bicycle; and
   a second bicycle wheel mount device configured to couple directly to the vehicle bumper at a second location on the vehicle bumper, wherein the second wheel mount device is configurable to support a second wheel of the bicycle;
   wherein the first bicycle wheel mount device is not configured to be coupled to the second bicycle wheel mount device apart from attachment to the vehicle bumper.

2. The bicycle carrying system of claim 1, wherein the bicycle carrying system is configured for removal from the vehicle and configured to fit in a computer bag when removed from the vehicle.

3. The bicycle carrying system of claim 1, further comprising one or more straps configured to secure a frame of the bicycle to the vehicle, wherein at least one of the one or more straps is configured to couple in a seam in the vehicle.

4. The bicycle carrying system of claim 1, wherein each of the first bicycle wheel mount device and the second bicycle wheel mount device include a stirrup configured to support a respective bicycle wheel, each stirrup being configured to provide an upward reactive force on the respective bicycle wheel.

5. The bicycle carrying system of claim 1, further comprising a wheel-holding device configurable to couple with a wheel of the bicycle to inhibit spinning of the wheel when the bicycle is carried on the vehicle.

6. The bicycle carrying system of claim 1, wherein the first bicycle wheel mount device is configured to couple on the left side of the vehicle bumper, wherein the second bicycle wheel mount device is configured to couple on the right side of the vehicle bumper.

7. The bicycle carrying system of claim 1, wherein at least one of the bicycle wheel mount devices is configured to mount in a threaded hole in the vehicle bumper.

8. The bicycle carrying system of claim 1, further comprising one or more straps configured to secure a frame of the bicycle to the vehicle, wherein at least one of the one or more straps is configured to couple in a latch for a hatch window.

9. The bicycle carrying system of claim 1, wherein at least one of the bicycle wheel mount devices is adjustable to support wheels of bicycles having different wheel base dimensions, wherein to adjust the at least one of the bicycle wheel mount devices to support a larger wheel base dimension, the at least one of the bicycle wheel mount devices is rotated in a first direction, and to adjust the at least one of the bicycle wheel mount devices to support a smaller wheel base dimension, the at least one of the bicycle wheel mount devices is rotated in a second direction different from the first position.

10. The bicycle carrying system of claim 1, wherein at least one of the bicycle wheel mount devices comprises a bicycle wheel-mount portion and two or more vehicle-mounting adapters, wherein each of at least two of the vehicle-mounting adapters is selectable by a user to couple with the bicycle wheel-mount portion and configurable to mount the bicycle wheel-mount portion of the wheel mount device to a vehicle having a different bumper configuration.

11. A bicycle wheel mount device, comprising:
   a first end including a bumper-mounting portion configured to mount on a bumper of a vehicle; and a second end including a bicycle wheel mount portion coupled to the bumper-mounting portion, wherein the bicycle wheel mount portion is configurable to support a bicycle wheel of a bicycle;

wherein the bicycle wheel mount device is configured to support only one bicycle wheel.

12. The bicycle wheel mount device of claim 11, wherein the bicycle wheel mount portion is manually separable from the bumper-mounting portion.

13. The bicycle wheel mount device of claim 12, wherein further comprising a threaded connection between the bicycle wheel mount portion and the bumper-mounting portion.

14. The bicycle wheel mount device of claim 11, wherein the bicycle tire support portion comprises a stirrup comprising a pair of cross members, wherein the pair of cross members are configured to support a bicycle tire.

15. The bicycle wheel mount device of claim 11, further comprising a strap configured to strap down on a rim of the bicycle tire to inhibit separation of the bicycle tire from the bicycle tire support portion.

16. The bicycle wheel mount device of claim 11, wherein the bumper-mounting portion comprises a threaded portion configured to couple in a threaded socket in a vehicle bumper.

17. The bicycle wheel mount device of claim 11, further comprising a tension joint between the bicycle wheel mount portion and the bumper-mounting portion, wherein the tension joint is operable by a user to adjust the angle of the bicycle wheel mount portion relative to the bumper-mounting portion in order to allow bicycles of varying wheelbase dimensions to be carried.

18. A method for utilizing a bicycle carrying system with a vehicle, the method comprising:

coupling a first bicycle wheel mount device directly to a vehicle bumper at a first location on the vehicle bumper, wherein the first wheel mount device is configurable to support a first wheel of a bicycle; and coupling a second bicycle wheel mount device directly to the vehicle bumper at a second location on the vehicle bumper, wherein the second wheel mount device is configurable to support a second wheel of the bicycle;

wherein the first bicycle wheel mount device is not configured to be coupled to the second bicycle wheel mount device apart from attachment to the vehicle bumper.

19. The method of claim 18, further comprising providing at least one securement devices comprising at least one strap configured to secure at least a portion of a frame of a bicycle, wherein securing at least a portion of the frame comprises strapping at least a portion of the frame to the vehicle.

20. The method of claim 18, wherein supporting the first wheel comprises mounting the first wheel of the bicycle on at least one wheel supporting device, the method further comprising:

removing the first and second wheel mount devices from the vehicle;

stowing the first and second wheel mount devices and the at least one securement device in a bag; and carrying, by a person, the at least one wheel mount device.

21. The method of claim 18, wherein supporting the at least one wheel comprises mounting a wheel of the bicycle on at least one wheel supporting device, the method further comprising:

removing the at least one wheel mount device and the at least one securement device from the vehicle; and carrying the at least one wheel mount device and the at least one securement device on the bicycle while the bicycle is ridden by a user.

22. The method of claim 18, further comprising switching between a bicycle-riding mode of transportation and a driving mode of transportation, wherein the first and second wheel mount devices and the at least one securement device are carried by the user during the bicycle-riding mode.

* * * * *